(12) United States Patent
Ouderkirk et al.

(10) Patent No.: US 6,573,963 B2
(45) Date of Patent: Jun. 3, 2003

(54) CHOLESTERIC LIQUID CRYSTAL OPTICAL BODIES AND METHODS OF MANUFACTURE

(75) Inventors: Andrew John Ouderkirk, Woodbury, MN (US); John David Munter, Oakdale, MN (US); Marvin Ray Kammin, Minneapolis, MN (US)

(73) Assignee: 3M InnovativeProperties Company, St. Paul, MN (US)

( * ) Notice: Subject to any disclaimer, the term of this patent is extended or adjusted under 35 U.S.C. 154(b) by 156 days.

(21) Appl. No.: 09/790,832

(22) Filed: Feb. 22, 2001

(65) Prior Publication Data

US 2002/0113937 A1 Aug. 22, 2002

(51) Int. Cl.$^7$ ............................................. G02F 1/1335
(52) U.S. Cl. ......................... 349/117; 349/98; 349/115
(58) Field of Search .......................... 349/98, 115, 175, 349/194, 185

(56) References Cited

U.S. PATENT DOCUMENTS

| ,540,768 A | 6/1895 | Western |
| 3,124,639 A | 3/1964 | Kahn ........................... 88/65 |
| 3,508,947 A | 4/1970 | Hughes ...................... 117/34 |
| 3,610,729 A | 10/1971 | Rogers ....................... 350/157 |
| 3,711,176 A | 1/1973 | Alfrey, Jr. et al. ............... 350/1 |
| 3,860,036 A | 1/1975 | Newman, Jr. ................ 138/45 |
| 3,996,885 A | 12/1976 | Jackson et al. .............. 118/50 |
| 4,001,024 A | 1/1977 | Dittman et al. ................ 96/87 |
| 4,293,435 A | 10/1981 | Portugall et al. ....... 252/299.01 |
| 4,446,305 A | 5/1984 | Rogers et al. ............... 528/348 |

(List continued on next page.)

FOREIGN PATENT DOCUMENTS

| DE | 197 45 647 A1 | 4/1999 | ............ C09D/5/33 |
| EP | 0860717 | * 8/1997 | |
| EP | 0 834 754 | 4/1998 | ............ G02B/5/30 |
| EP | 0860716 | * 8/1998 | |
| EP | 0 867 749 | 9/1998 | .......... G02F/1/1335 |

(List continued on next page.)

OTHER PUBLICATIONS

Mauer et al., Polarizing Color Filters Made From Cholesteric LC Silicones, SID Digest 1990, pp. 110–112.*
Schrenk et al., Nanolayer Polymeric Optical Films, Tappi Journal, pp. 169–174, Jun. 1992.
Weber et al., "Giant Birefringent Optics in Multilayer Polymer Mirrors", Science, vol. 287, Mar. 31, 2000, pp. 2451–2456.

*Primary Examiner*—James Dudek
*Assistant Examiner*—David Chung
(74) *Attorney, Agent, or Firm*—Bruce E. Black

(57) ABSTRACT

An optical body can be formed using cholesteric liquid crystal materials. At least two different coating compositions containing cholesteric liquid crystal material are coated on a substrate. At least a portion of each composition is allowed to interdiffuse to generate a change in pitch along a thickness dimension of the optical body. This optical body can be used, for example, as a reflective polarizer in an optical display.

29 Claims, 12 Drawing Sheets

U.S. PATENT DOCUMENTS

| | | | |
|---|---|---|---|
| 4,520,189 A | 5/1985 | Rogers et al. | 528/331 |
| 4,521,588 A | 6/1985 | Rogers et al. | 528/363 |
| 4,525,413 A | 6/1985 | Rogers et al. | 428/212 |
| 4,720,426 A | 1/1988 | Englert et al. | 428/344 |
| 4,974,941 A | 12/1990 | Gibbons et al. | 350/349 |
| 5,032,009 A | 7/1991 | Gibbons et al. | 350/341 |
| 5,188,760 A | 2/1993 | Hikmet et al. | 252/299.01 |
| 5,211,878 A | 5/1993 | Reiffenrath et al. | 252/299.63 |
| 5,235,443 A | 8/1993 | Barnik et al. | 359/37 |
| 5,269,995 A | 12/1993 | Ramanathan et al. | 264/171 |
| 5,294,657 A | 3/1994 | Melendy et al. | 524/270 |
| 5,316,703 A | 5/1994 | Schrenk | 264/1.3 |
| 5,319,478 A | 6/1994 | Fijnfschilling et al. | 359/53 |
| 5,332,522 A | 7/1994 | Chen et al. | 252/299.01 |
| 5,389,324 A | 2/1995 | Lewis et al. | 264/171 |
| 5,389,698 A | 2/1995 | Chigrinov et al. | 522/2 |
| 5,448,404 A | 9/1995 | Schrenk et al. | 359/584 |
| 5,486,935 A | 1/1996 | Kalmanash | 359/37 |
| 5,486,949 A | 1/1996 | Schrenk et al. | 359/498 |
| 5,506,704 A | 4/1996 | Broer et al. | |
| 5,602,661 A | 2/1997 | Schadt et al. | 349/124 |
| 5,612,820 A | 3/1997 | Schrenk et al. | 359/498 |
| 5,629,055 A | 5/1997 | Revol et al. | 428/1 |
| 5,686,979 A | 11/1997 | Weber et al. | 349/96 |
| 5,699,188 A | 12/1997 | Gilbert et al. | 359/584 |
| 5,721,603 A | 2/1998 | De Vaan et al. | 349/194 |
| 5,741,549 A | 4/1998 | Maier et al. | 427/294 |
| 5,744,057 A | 4/1998 | Meyer et al. | 252/299 |
| 5,744,534 A | 4/1998 | Ishiharada et al. | 524/442 |
| 5,751,388 A | 5/1998 | Larson | 349/96 |
| 5,767,935 A | 6/1998 | Ueda et al. | 349/112 |
| 5,770,306 A | 6/1998 | Suzuki et al. | 428/328 |
| 5,780,629 A | 7/1998 | Etzbach et al. | 544/296 |
| 5,783,120 A | 7/1998 | Ouderkirk et al. | 264/134 |
| 5,793,456 A | 8/1998 | Broer et al. | 349/98 |
| 5,808,794 A | 9/1998 | Weber et al. | 359/487 |
| 5,825,542 A | 10/1998 | Cobb, Jr. et al. | 359/487 |
| 5,825,543 A | 10/1998 | Ouderkirk et al. | 359/494 |
| 5,838,407 A | 11/1998 | Chigrinov et al. | 349/187 |
| 5,847,068 A | 12/1998 | Maxein et al. | 528/69 |
| 5,867,316 A | 2/1999 | Carlson et al. | 359/500 |
| 5,882,774 A | 3/1999 | Jonza et al. | 428/212 |
| 5,886,242 A | 3/1999 | Etzbach et al. | 585/25 |
| 5,889,614 A | 3/1999 | Cobben et al. | |
| 5,940,149 A | 8/1999 | Vanderwerf | 349/5 |
| 5,958,293 A | 9/1999 | Gibbons et al. | 252/299.4 |
| 5,962,114 A | 10/1999 | Jonza et al. | 428/212 |
| 5,965,247 A | 10/1999 | Jonza et al. | 428/212 |
| 6,001,277 A | 12/1999 | Ichimura et al. | 252/299.4 |
| 6,088,079 A | 7/2000 | Kameyama et al. | 349/185 |
| 6,096,375 A | 8/2000 | Ouderkirk et al. | 427/163.1 |
| 6,111,697 A | 8/2000 | Merrill et al. | 359/497 |
| 6,113,679 A | 9/2000 | Adkins et al. | 106/31.6 |
| 6,181,395 B1 | 1/2001 | Li et al. | |

FOREIGN PATENT DOCUMENTS

| | | | |
|---|---|---|---|
| EP | 0881509 | * 12/1998 | |
| EP | 0881510 | * 12/1998 | |
| EP | 0 606 940 B1 | 4/1999 | |
| JP | 8-271731 | 10/1996 | G02B/5/30 |
| JP | 9-133810 | 5/1997 | G02B/5/30 |
| JP | 9-189811 | 7/1997 | G02B/5/30 |
| JP | 9-304770 | 11/1997 | G02F/1/1335 |
| JP | 10-54905 | 2/1998 | G02B/5/20 |
| JP | 10-54909 | 2/1998 | G02B/5/30 |
| JP | 10-142407 | 5/1998 | G02B/5/02 |
| JP | 10-158268 | 6/1998 | C07D/493/04 |
| JP | 10-197722 | 7/1998 | G02B/5/30 |
| JP | 10-319233 | 12/1998 | G02B/5/30 |
| JP | 10-319235 | 12/1998 | G02B/5/30 |
| JP | 10-321025 | 12/1998 | G21B/9/14 |
| JP | 10-321026 | 12/1998 | F21B/9/14 |
| JP | 10-339812 | 12/1998 | G02B/5/30 |
| JP | 10-339867 | 12/1998 | G02F/1/1333 |
| JP | 11-44816 | 2/1999 | G02B/5/30 |
| JP | 11-52133 | 2/1999 | G02B/5/30 |
| JP | 11-64840 | 3/1999 | G02F/1/1335 |
| JP | 11-64841 | 3/1999 | G02F/1/1335 |
| JP | 11-109353 | 4/1999 | G02F/1/1337 |
| JP | 11-125717 | 5/1999 | G02B/5/30 |
| JP | 11-133231 | 5/1999 | G02B/5/30 |
| JP | 11-160539 | 6/1999 | G02B/5/30 |
| WO | WO 95/27919 | 4/1995 | G02B/27/28 |
| WO | WO 95/17303 | 6/1995 | B32B/7/02 |
| WO | WO 95/17691 | 6/1995 | G02B/5/30 |
| WO | WO 95/17692 | 6/1995 | G02B/5/30 |
| WO | WO 95/17699 | 6/1995 | G02F/1/1335 |
| WO | 96/06379 | * 2/1996 | |
| WO | WO 97/01440 | 1/1997 | B32B/27/36 |
| WO | WO 97/01774 | 1/1997 | G02B/1/10 |
| WO | 97/16762 | * 5/1997 | |
| WO | WO/97/35219 | 9/1997 | |
| WO | WO 99/36248 | 7/1999 | B29C/47/70 |
| WO | WO 99/36262 | 7/1999 | B32B/27/00 |
| WO | WO/00/31572 | 6/2000 | |
| WO | WO/00/70400 | 11/2000 | |

* cited by examiner

CHOLESTERIC LIQUID CRYSTAL OPTICAL BODIES AND METHODS OF MANUFACTURE

FIELD OF THE INVENTION

The present invention relates to optical bodies containing cholesteric liquid crystals. The present invention also relates to reflective optical polarizers formed by simultaneous coating of two or more layers of cholesteric liquid crystals or cholesteric liquid crystal precursors.

BACKGROUND OF THE INVENTION

Optical devices, such as polarizers and mirrors, are useful in a variety of applications including liquid crystal displays (LCD's). Liquid crystal displays fall broadly into two categories: backlit (e.g., transmissive) displays, where light is provided from behind the display panel, and frontlit (e.g., reflective) displays, where light is provided from the front of the display (e.g., ambient light). These two display modes can be combined to form transflective displays that can be backlit, for example, under dim light conditions or read under bright ambient light.

Conventional backlit LCD displays typically use absorbing polarizers and can have less than 10% light transmission. Conventional reflective LCD displays are also based on absorbing polarizers and typically have less than 25% reflectivity. The low transmission or reflectance of these displays reduces display contrast and brightness and can require high power consumption.

Reflective polarizers have been developed for use in displays and other applications. Reflective polarizers preferentially transmit light of one polarization and preferentially reflect light having an orthogonal polarization. It is preferred that reflective polarizers transmit and reflect light without absorbing relatively large amounts of the light. Preferably, the reflective polarizer has less than 10% absorption for the transmission polarization. Most LCD's operate over a broad range of wavelengths and, as a consequence, the reflective polarizer must typically operate over that broad wavelength range, as well.

In backlit displays, the reflective polarizer can be used to increase the efficiency of light utilization by reflecting the polarization of the light not transmitted by the polarizer back into the backlight. The backlight converts the polarization state of the recycled light for transmission through the reflective polarizer. This light recycling can increase total display brightness. In reflective and transflective displays, the reflective polarizer has lower absorptivity and color than most absorbing polarizers for the pass polarization of light, and can increase brightness of the display by up to 50% or more. Characteristics of reflective polarizers that are important to at least some applications include, for example, the thickness of the polarizer, the uniformity of reflection over a wavelength range, and the relative amount of light reflected over the wavelength range of interest.

SUMMARY OF THE INVENTION

Generally, the present invention relates to optical bodies containing cholesteric liquid crystals and their manufacture, as well as the use of cholesteric liquid crystals in optical devices, such as reflective polarizers. One embodiment is a method of making an optical body. A first coating composition and a second coating composition are coated onto a substrate with the first coating composition between the substrate and the second coating composition. The first and second coating compositions are different and include at least one cholesteric liquid crystal material selected from cholesteric liquid crystal compounds and cholesteric liquid crystal monomers. At least a portion of the second coating composition interdiffuses with a portion of the first coating composition. After interdiffusion, at least one cholesteric liquid crystal layer is formed from the first and second coating compositions. The coating of the first and second coating compositions can be done separately or simultaneously. Simultaneous coating methods include, for example, slide coating, curtain coating, and extrusion bar coating. Additional coating compositions (e.g., a third or fourth coating composition) can also be applied and, optionally, at least partially interdiffused with the preceding coating compositions. The optical body can be used as a reflective polarizer to form an optical display when combined, for example, with a display medium.

Another embodiment is another method of making an optical body. A first coating composition is disposed on a substrate and a second coating composition is disposed on the first coating composition. Each coating composition includes a solvent and a cholesteric liquid crystal material selected from cholesteric liquid crystal polymers and cholesteric liquid crystal monomers. At least a portion of the second coating composition is interdiffused with at least a portion of the first coating composition. After interdiffusion, substantially all of the solvent from both coating compositions, is eliminated. This can include, for example, evaporating a solvent or reacting the solvent to form a polymeric composition. At least one cholesteric liquid crystal layer is formed from the first and second coating compositions. The cholesteric liquid crystal layer can have a pitch that substantially continuously changes over a range of values along at least a portion of a thickness dimension of the layer.

Yet another embodiment is an optical body that includes a cholesteric liquid crystal layer. Along at least a portion of a thickness dimension of the cholesteric liquid crystal layer, a pitch of the layer begins at a first pitch, increases to a second pitch, decreases to a third pitch, and increases to a fourth pitch. This optical body can be used in an optical display as a reflective polarizer.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
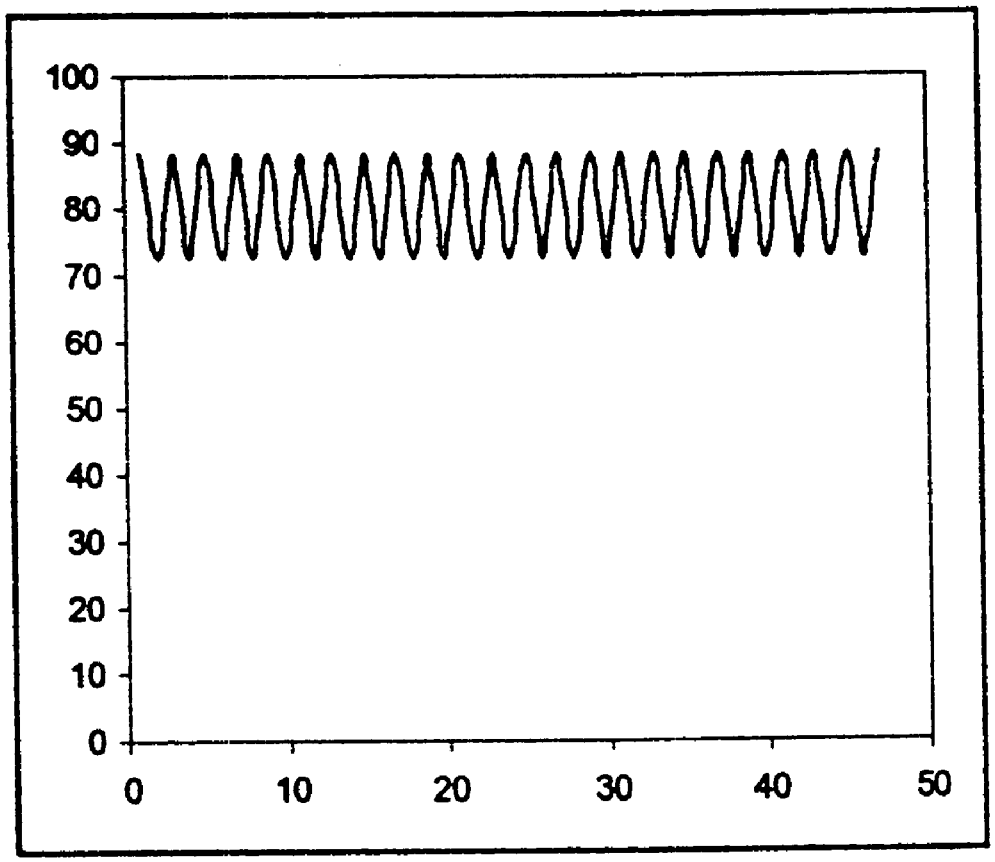
FIG. 1 is a calculated graph of step index thickness versus step number for a single cholesteric liquid crystal layer having a uniform pitch.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENTS

The present invention is believed to be applicable to optical bodies (such as optical films) and their manufacture, as well as the use of the optical bodies in optical devices, such as reflective polarizers and optical displays (e.g., liquid crystal displays). The present invention is also directed to optical bodies containing cholesteric liquid crystals. While the present invention is not so limited, an appreciation of various aspects of the invention will be gained through a discussion of the examples provided below.

The term "polymer" will be understood to include polymers, copolymers (e.g., polymers formed using two or more different monomers), and combinations thereof, as well as polymers or copolymers that can be formed in a miscible blend by, for example, coextrusion or reaction, including transesterification. Both block and random copolymers are included, unless indicated otherwise.

The term "polymeric material" will be understood to include polymers, as defined above, and other organic or inorganic additives, such as, for example, antioxidants, stabilizers, antiozonants, and plasticizers.

The terms "interdiffusion", "interdiffuse", and the like, as used herein, refers to molecular or macromolecular diffusion between two layers where species from either or both layers diffuse into the other layer.

All index of refraction values are reported for 632.8 nm light unless otherwise indicated.

The term "polarization" can refer to plane polarization, circular polarization, elliptical polarization, or any other nonrandom polarization state in which the electric vector of the beam of light does not change direction randomly, but either maintains a constant orientation or varies in a systematic manner. In plane polarization, the electric vector remains in a single plane, while in circular or elliptical polarization, the electric vector of the beam of light rotates in a systematic manner.

Reflective polarizers preferentially transmit light of one polarization and reflect the remaining light. In the case of reflective plane polarizers, light polarized in one plane is preferentially transmitted, while light polarized in the orthogonal plane is preferentially reflected. In the case of circular reflective polarizers, light circularly polarized in one sense, which may be the clockwise or counterclockwise sense (e.g., right-handed or left-handed), is preferentially transmitted and light polarized in the opposite sense is preferentially reflected. One type of circular polarizer includes cholesteric liquid crystal polarizers.

The term "cholesteric liquid crystal compound" refers to compounds (including polymers) that can form a cholesteric liquid crystal phase.

Cholesteric Liquid Crystal Compounds

Cholesteric liquid crystal compounds are typically chiral molecules and can be polymers. Such compounds typically include molecular units that are chiral in nature (e.g., do not posses a mirror plane) and molecular units that are mesogenic in nature (e.g., exhibit liquid crystal phases). Cholesteric liquid crystal compounds include compounds having a cholesteric liquid crystal phase in which the director (i.e., the unit vector in the direction of average local molecular alignment) of the liquid crystal rotates in a helical fashion along the dimension perpendicular to the director. Cholesteric liquid crystal compounds are also referred to as chiral nematic liquid crystal compounds. The pitch of the cholesteric liquid crystal compound is the distance (in a direction perpendicular to the director) that it takes for the director to rotate through 360°. This distance is typically 100 nm or more.

The pitch of a cholesteric liquid crystal compound can typically be altered by mixing or otherwise combining (e.g., by copolymerization) a chiral compound (e.g., a cholesteric liquid crystal compound) with a nematic liquid crystal compound. The pitch depends on the relative ratios by weight of the chiral compound and the nematic liquid crystal compound. The pitch is generally selected to be on the order of the wavelength of light of interest. The helical twist of the director results in a spatially periodic variation in the dielectric tensor, which in turn give rise to the wavelength selective reflection of light. For example, the pitch can be selected such that the selective reflection is peaked in the visible, ultraviolet, or infrared wavelengths of light.

Cholesteric liquid crystal compounds, including cholesteric liquid crystal polymers, are generally known and typically any of these materials can be used to make optical bodies. Examples of suitable cholesteric liquid crystal polymers are described in U.S. Pat. Nos. 4,293,435 and 5,332,522, both of which are incorporated herein by reference. However, other cholesteric liquid crystal compounds can also be used. Typically, a cholesteric liquid crystal compound is selected for a particular application or optical body based on one or more factors including, for example, refractive indices, pitch, processability, clarity, color, low absorption in the wavelength of interest, compatibility with other components (e.g., a nematic liquid crystal compound), ease of manufacture, availability of the liquid crystal compound or monomers to form a liquid crystal polymer, rheology, method and requirements of curing, ease of solvent removal, physical and chemical properties (for example, flexibility, tensile strength, solvent resistance, scratch resistance, and phase transition temperature), and ease of purification.

Cholesteric liquid crystal polymers are typically formed using chiral (or a mixture of chiral and achiral) molecules (including monomers) that can include a mesogenic group (e.g., a rigid group that typically has a rod-like structure to facilitate formation of a cholesteric liquid crystal phase). Mesogenic groups include, for example, para-substituted cyclic groups (e.g., para-substituted benzene rings). These mesogenic groups are optionally bonded to a polymer backbone through a spacer. The spacer can contain functional groups having, for example, benzene, pyridine, pyrimidine, alkyne, ester, alkylene, alkane, ether, thioether, thioester, and amide functionalities.

Suitable cholesteric liquid crystal polymers include polymers having a chiral polyester, polycarbonate, polyamide, polymethacrylate, polyacrylate, polysiloxane, or polyesterimide backbone that includes mesogenic groups optionally separated by rigid or flexible comonomers. Other suitable cholesteric liquid crystal polymers have a polymer backbone (for example, a polyacrylate, polymethacrylate, polysiloxane, polyolefin, or polymalonate backbone) with chiral mesogenic side-chain groups. The side-chain groups are optionally separated from the backbone by a spacer, such as an alkylene or alkylene oxide spacer, to provide flexibility.

Typically, to form a cholesteric liquid crystal layer, a cholesteric liquid crystal composition is coated onto a surface. The cholesteric liquid crystal composition includes at least one chiral compound (e.g., cholesteric liquid crystal compound) or chiral monomer (cholesteric liquid crystal monomer) that can be used (e.g., polymerized or crosslinked) to form a cholesteric liquid crystal polymer. The cholesteric liquid crystal composition can also include at least one nematic liquid crystal compound or nematic liquid crystal monomer that can be used to form a nematic liquid crystal polymer. The nematic liquid crystal compound(s) or nematic liquid crystal monomer(s) can be used to modify the pitch of the cholesteric liquid crystal composition. The cholesteric liquid crystal composition can also include one or more processing additives, such as, for example, curing agents, crosslinkers, or ultraviolet, infrared, antiozonant, antioxidant, or visible light-absorbing dyes.

Cholesteric liquid crystal compositions can also be formed using two or more different types of any of the following: cholesteric liquid crystals, cholesteric liquid crystal monomers, nematic liquid crystals, nematic liquid crystal monomers, or combinations thereof. The particular ratio(s) by weight of materials in the cholesteric liquid crystal composition will typically determine, at least in part, the pitch of the cholesteric liquid crystal layer.

The cholesteric liquid crystal composition also typically includes a solvent. The term "solvent", as used herein, also refers to dispersants and combinations of two or more solvents and dispersants. In some instances, one or more of the liquid crystal compounds, liquid crystal monomers, or processing additives also acts as a solvent. The solvent can be substantially eliminated from the coating composition by, for example, drying the composition to evaporate the solvent or reacting a portion of the solvent (e.g., reacting a solvating liquid crystal monomer to form a liquid crystal polymer).

After coating, the cholesteric liquid crystal composition is converted into a liquid crystal layer. This conversion can be accomplished by a variety of techniques including evaporation of a solvent; crosslinking the cholesteric liquid crystal compound(s) or cholesteric liquid crystal monomer(s); or curing (e.g., polymerizing) the cholesteric liquid crystal monomer(s) using, for example, heat, radiation (e.g., actinic radiation), light (e.g., ultraviolet, visible, or infrared light), an electron beam, or a combination of these or like techniques.

The cholesteric liquid crystal phase can be achieved using conventional treatments. For example, a method of developing a cholesteric liquid crystal phase includes depositing the cholesteric liquid crystal composition on an oriented substrate. The substrate can be oriented using, for example, drawing techniques or rubbing with a rayon or other cloth. After deposition, the cholesteric liquid crystal composition is heated above the glass transition temperature of the composition to the liquid crystal phase. The composition is then cooled below the glass transition temperature; the liquid crystal phase remaining fixed.

Cholesteric Liquid Crystal Optical Bodies

Cholesteric liquid crystal compositions (with or without additional nematic liquid crystal compound(s) or monomer(s) added to modify the pitch) can be formed into a layer that substantially reflects light having one circular polarization (e.g., left or right circularly polarized light) and substantially transmits light having the other circular polarization (e.g., right or left circularly polarized light) over a particular bandwidth of light wavelengths. This characterization describes the reflection or transmission of light directed at normal incidence to the director of the cholesteric liquid crystal material. Light that is directed at other angles will typically be elliptically polarized by the cholesteric liquid crystal material. Cholesteric liquid crystal materials are generally characterized with respect to normally incident light, as done below, however, it will be recognized that the response of these materials can be determined for non-normally incident light using known techniques.

The cholesteric liquid crystal layer can be used alone or in combination with other layers or devices to form an optical body, such as, for example, a reflective polarizer. Cholesteric liquid crystal polarizers are used in one type of reflective polarizer. The pitch of a cholesteric liquid polarizer is similar to the optical layer thickness of multilayer reflective polarizers. Pitch and optical layer thickness determine the center wavelength of the cholesteric liquid crystal polarizers and multilayer reflective polarizers, respectively. The rotating director of the cholesteric liquid crystal polarizer forms optical repeat units similar to the use of multiple layers having the same optical layer thickness in multilayer reflective polarizers.

The center wavelength, $\lambda_0$, and the spectral bandwidth, $\Delta\lambda$, of the light reflected by the cholesteric liquid crystal layer depend on the pitch, p, of the cholesteric liquid crystal. The center wavelength, $\lambda_0$, is approximated by:

$$\lambda_0 = 0.5(n_o + n_e)p$$

where $n_o$ and $n_e$ are the refractive indices of the cholesteric liquid crystal for light polarized parallel to the director of the liquid crystal ($n_e$) and for light polarized perpendicular to the director of the liquid crystal ($n_o$). The spectral bandwidth, $\Delta\lambda$, is approximated by:

$$\Delta\lambda = 2\lambda_0(n_e - n_o)/(n_e + n_o) = p(n_e - n_o).$$

FIG. 1 shows a calculated graph of step index thickness (nm) versus step number for a layer of a cholesteric liquid crystal composition having a constant pitch. The step index thickness corresponds to a thickness of material corresponding to a half wave plate for the index of refraction of the material. FIG. 1 illustrates that one polarization of light experiences two different indices of refraction, $n_e$ and $n_o$. The sum of the high and low step index thicknesses corresponds to the pitch. The step number indicates a transition, for the polarization of light, from a region of one index of refraction to a region of a second index of refraction. Two steps corresponds to one rotation of the pitch.

Figure 2:
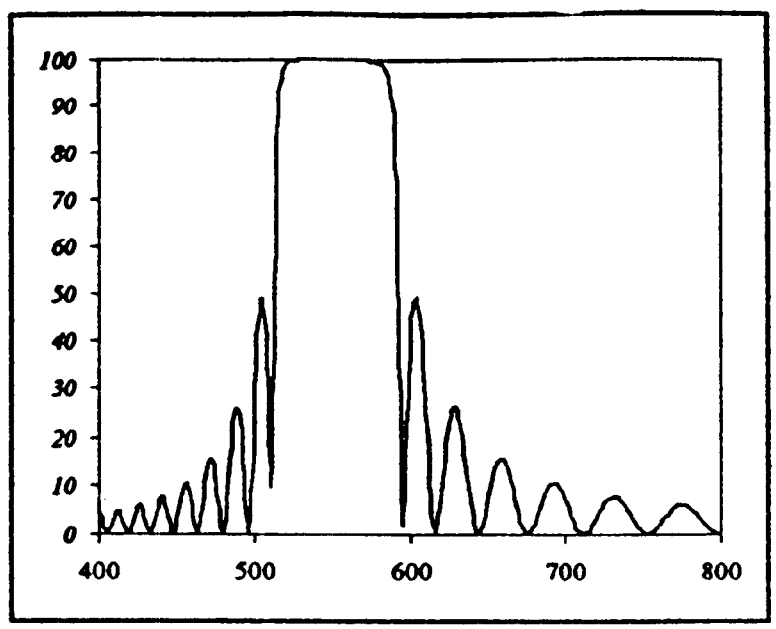
FIG. 2 is a calculated reflectance spectrum for the cholesteric liquid crystal layer of FIG. 1.

FIG. 2 is a calculated reflectivity spectrum, as a function of wavelength, for the polarization of light reflected by the cholesteric liquid crystal layer of FIG. 1. The spectral bandwidth (measured as full width at half peak height) of a single layer of cholesteric liquid crystal polymer is typically about 100 nm or less. This limits the usefulness of the cholesteric liquid crystal composition when reflectivity over the entire visible light range (about 400 to 700 nm), or any other wavelength range substantially larger than 100 nm, is desired.

Figure 3:
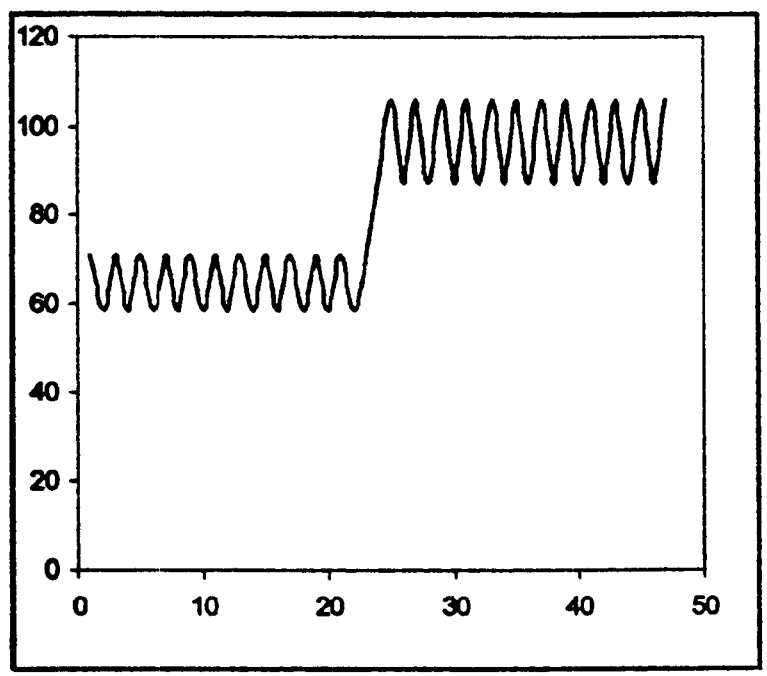
FIG. 3 is a calculated graph of step index thickness versus step number for a two cholesteric liquid crystal layer having different pitches.
Figure 4:
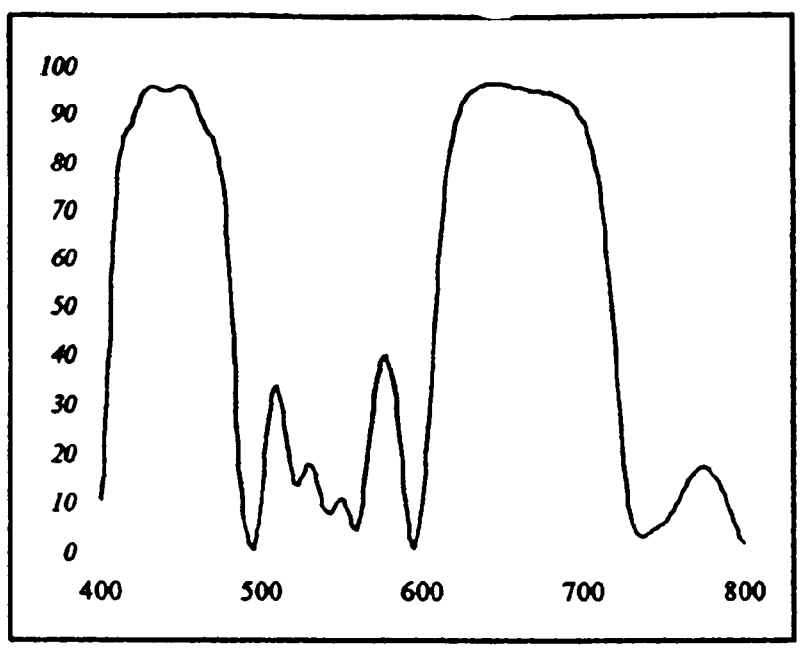
FIG. 4 is a calculated reflectance spectrum for the cholesteric liquid crystal layers of FIG. 3.

FIG. 3 illustrates a calculated graph of pitch layer thickness (nm) versus pitch layer number for a reflective polarizer having two cholesteric liquid crystal layers placed one on top of the other. The two layers have different pitches so that the two layers reflect different wavelengths of light. FIG. 4 is a calculated reflectivity spectrum for the reflected polarization of light using this two layer structure. As shown in FIG. 4, the two layer construction results in more reflectivity over the entire bandwidth, but that reflectivity is not very uniform. In particular, the two layer structure includes two separate reflection bands from about 400 to 500 run and from about 600 to 700 nm. Non-uniform reflection typically causes the optical film to appear colored. The color, as observed from the transmitted light, typically corresponds to the wavelength(s) having lower reflectivity. The reflected light is also colored, typically corresponding to the highly reflected wavelengths.

Figure 5:
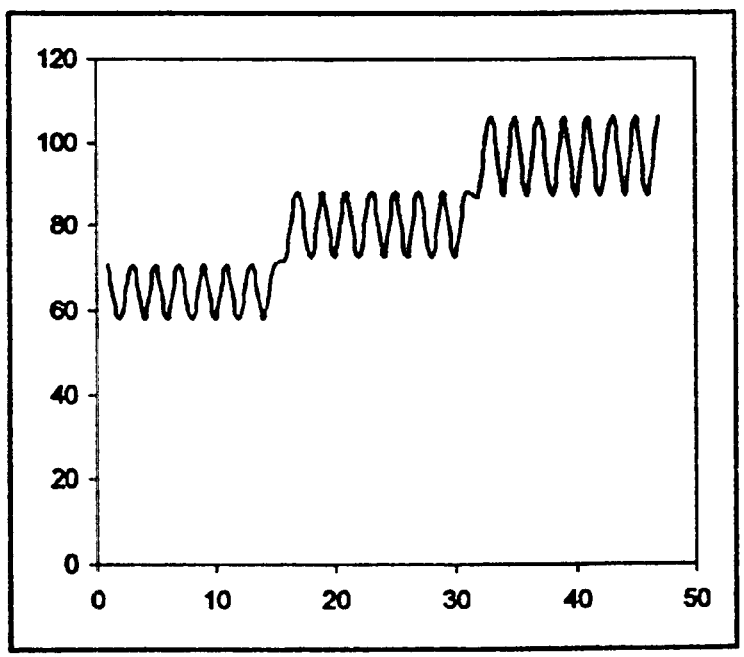
FIG. 5 is a calculated graph of step index thickness versus step number for three cholesteric liquid crystal layers having different pitches.
Figure 6:
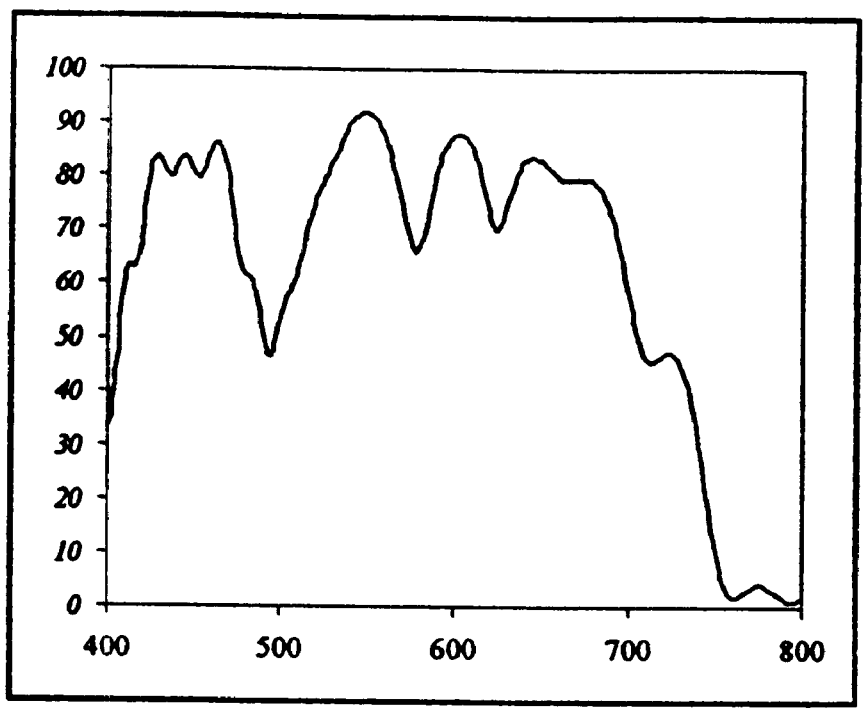
FIG. 6 is a calculated reflectance spectrum for the cholesteric liquid crystal layers of FIG. 5.

FIG. 5 illustrates a calculated graph of pitch layer thickness (nm) versus pitch layer number for a reflective polarizer having three stacked layers. The three layers have different pitches to reflect different wavelengths of light (e.g., red, green, and blue light). FIG. 6 is a calculated reflectivity spectrum for the reflected polarization of light using this three layer structure. As shown in FIG. 6, the three layer construction results in more reflectivity over the entire bandwidth and that reflectivity is more uniform than the two layer structure. There are still regions with significantly lower reflectivity, which can result in films with a colored appearance.

Figure 7:
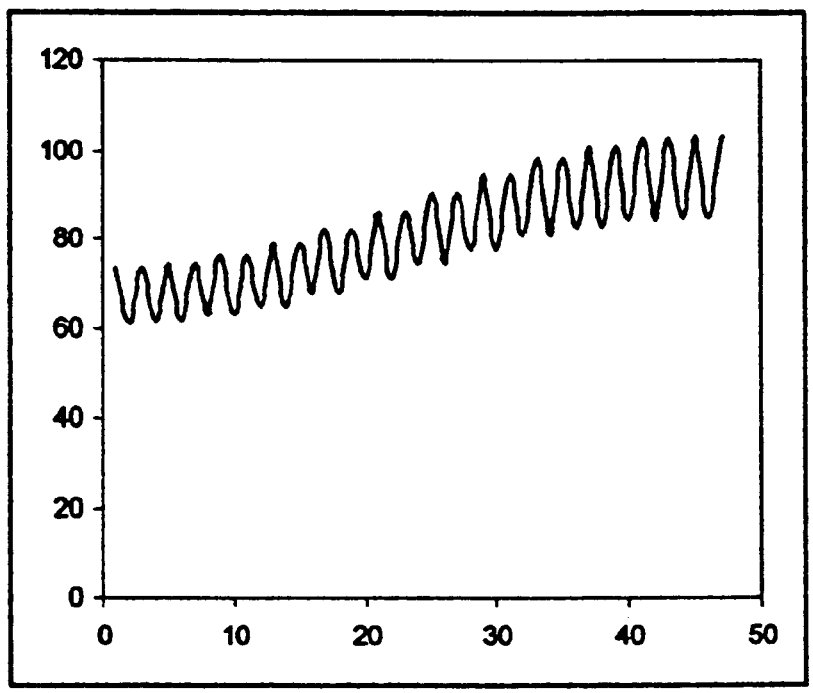
FIG. 7 is a calculated graph of step index thickness versus step number for a cholesteric liquid crystal layer having a varying pitch.
Figure 8:
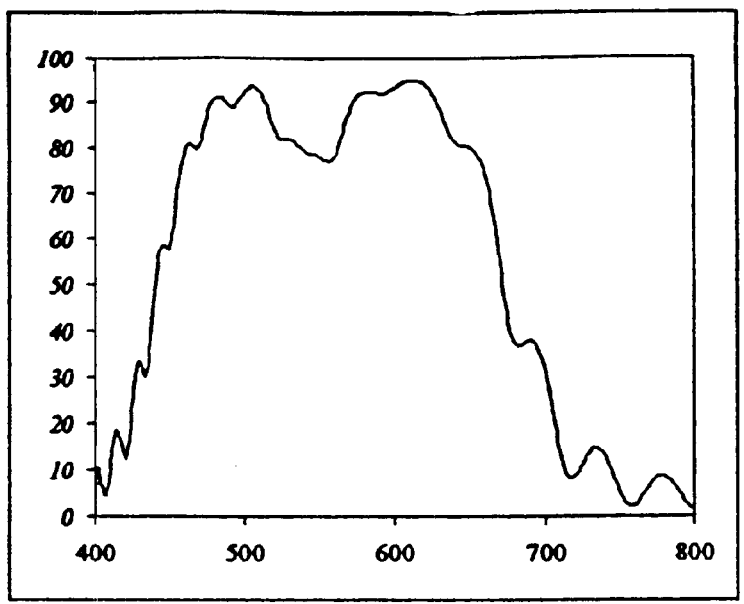
FIG. 8 is a calculated reflectance spectrum for the cholesteric liquid crystal layer of FIG. 7.

FIG. 7 illustrates a calculated graph of pitch layer thickness (nm) versus pitch layer number for a reflective polarizer where the pitch of the cholesteric liquid crystal increases monotonically over a range of values along at least a portion of the thickness dimension of the reflective polarizer. FIG. 8 illustrates the calculated reflectivity spectrum for the reflected polarization of light for this graded pitch structure. In this instance, the spectrum can be significantly smoother than in the previous cases; often resulting in higher overall reflectivity and less color as a result of more uniform reflection.

The structure represented by FIG. 7 has been previously formed by laminating or otherwise stacking two already-formed cholesteric liquid crystal layers with different pitches (e.g., layers having different compositions, for example, different ratios by weight of cholesteric and nematic liquid crystal compounds or liquid crystal monomers). These two layers are heated to diffuse liquid crystal material between the layers. The diffusion of material between the two layers typically results in the pitch of the layers varying over a range between the individual pitches of the two layers.

This method, however, requires a substantial number of processing steps including separately forming each layer (e.g., individually drying or curing each layer), stacking (e.g., laminating) the layers, and then heating the layers to cause diffusion of liquid crystal material between the two layers. This also requires substantial processing time, particularly, in view of the time required for diffusion between the two previously formed liquid crystal layers.

New Methods of Making Cholesteric Liquid Crystal Optical Bodies

A new method of forming cholesteric liquid crystal optical bodies includes coating at least two different cholesteric liquid crystal compositions onto a substrate and allowing interlayer diffusion between the compositions prior to converting the compositions into cholesteric liquid crystal layer (s). The conversion of the compositions into cholesteric liquid crystal layer(s) is accomplished by, for example, substantially eliminating all of the solvents, if solvent-based, or curing the liquid crystal compositions. The layer(s) are then heated followed by cooling to fix the layer(s) in the cholesteric liquid crystal phase. This method permits more rapid mixing between the liquid crystal compositions and can be accomplished without additional processing steps beyond those of coating the compositions on the substrate, allowing at least a portion of the material in the compositions to interdiffuse, and then drying or curing the compositions after interdiffusion. The drying can occur before or after partial or full curing of the compositions.

This method typically includes coating at least two different liquid crystal compositions containing cholesteric liquid crystal compound(s) or liquid crystal monomer(s) onto a substrate (e.g., a polymer substrate or previously formed liquid crystal layer). This can be performed using a variety of techniques and equipment. In one embodiment, two or more of the coating compositions are substantially simultaneously coated onto a substrate. Methods for substantially simultaneously coating two or more coating compositions on a substrate include, for example, slide coating, curtain coating, extrusion bar coating, and the like. Examples of the suitable methods for simultaneously coating two or more layers and suitable devices for performing these methods are disclosed, for example, in U.S. Pat. Nos. 3,508,947, 3,996,885, 4,001,024, and 5,741,549, all of which are incorporated herein by reference.

Figure 9:
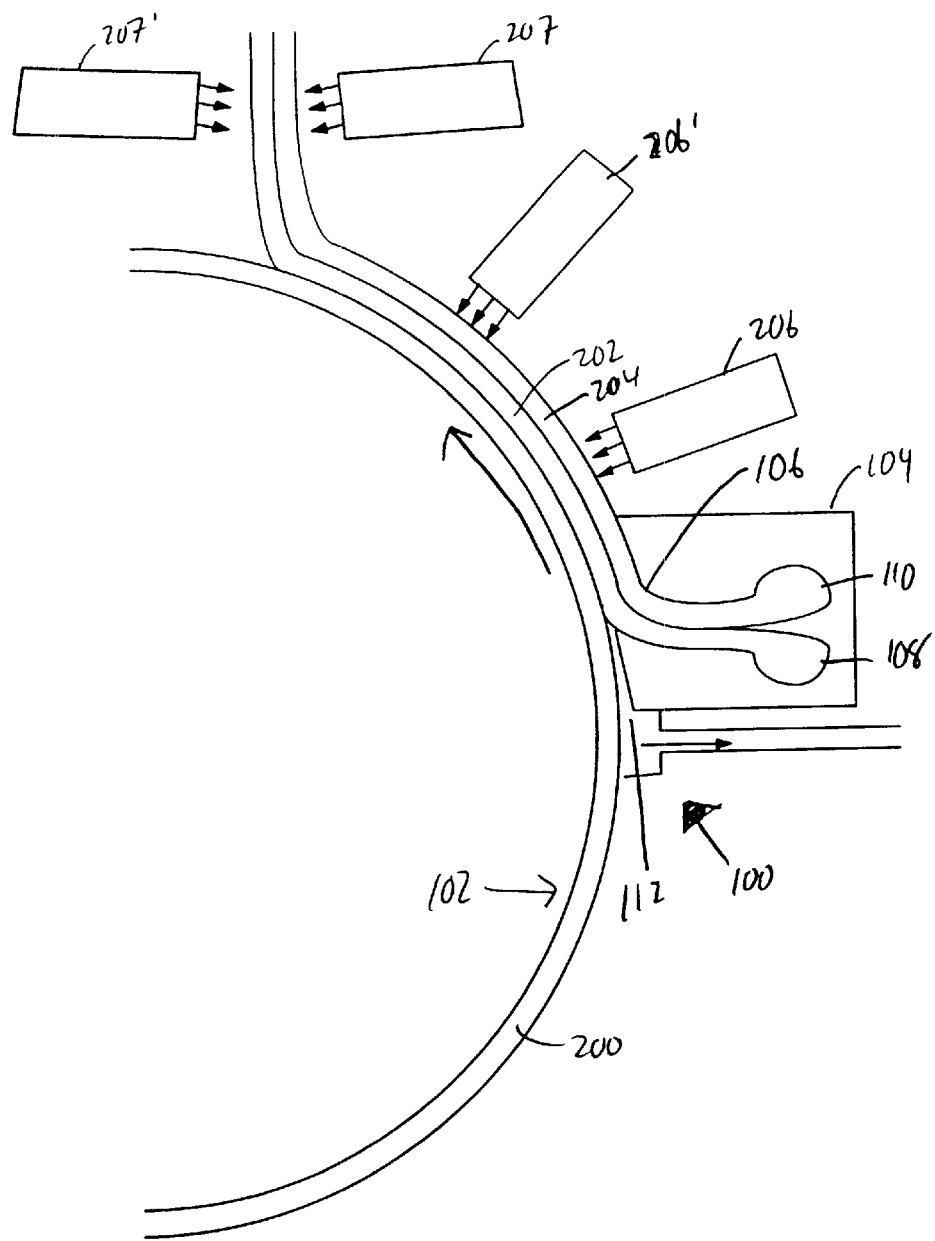
FIG. 9 is a schematic representation of one embodiment of a method and apparatus for substantially simultaneously coating two cholesteric liquid crystal compositions on a substrate.

FIG. 9 illustrates one method and device for accomplishing the substantially simultaneous coating of the two or more coating compositions onto a substrate. An extrusion bar coating apparatus 100 includes a carrier 102 (e.g., a roller, a casting wheel, reel, or continuous web carrier) that conveys the substrate 200 past a coating head 104. Two or more coating compositions 202 and 204 are substantially simultaneously coated on the substrate 200 through a slot 106 in the coating head 104. The coating compositions 202 and 204 are provided externally through supply ports 108 and 110 in the coating head 104. The speed of the substrate 200 and the flow rate of the coating compositions are controlled to provide the desired thickness of each of the compositions 202 and 204. Coating quality and uniformity can typically be improved by applying a vacuum through a gap 112.

The coating compositions 202 and 204 can include compounds having, for example, UV curable functional groups such as, for example, acrylates or other photocurable functional groups. When such compounds are present, interdiffusion between compositions 202 and 204 can be controlled by applying a suitable photocuring energy, using radiation source 206, for example, an ultraviolet lamp. A longer time for allowing more interdiffusion could be provided by placing the radiation source at position 206', instead. The degree of interdiffusion could also be controlled by altering the intensity of the radiation source 206 or the speed of the substrate 200. The coating compositions 202, 204 can be pulled away from the carrier 102, as illustrated in FIG. 9, and optionally illuminated with light from one or both sides using either or both of light sources 207, 207'.

Figure 10:
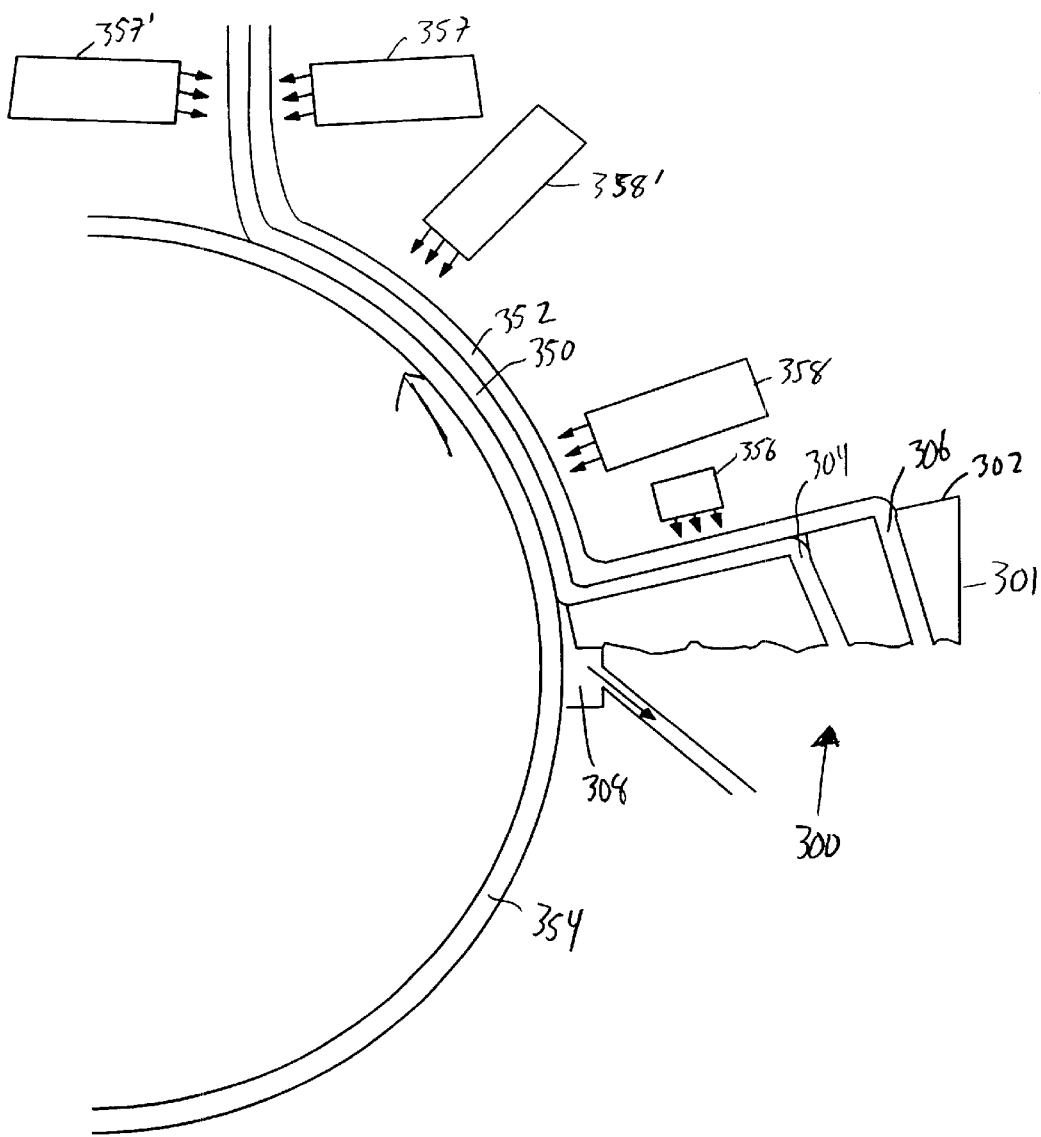
FIG. 10 is a schematic representation of a second embodiment of a method and apparatus for substantially simultaneously coating two cholesteric liquid crystal compositions on a substrate.
Figure 11:
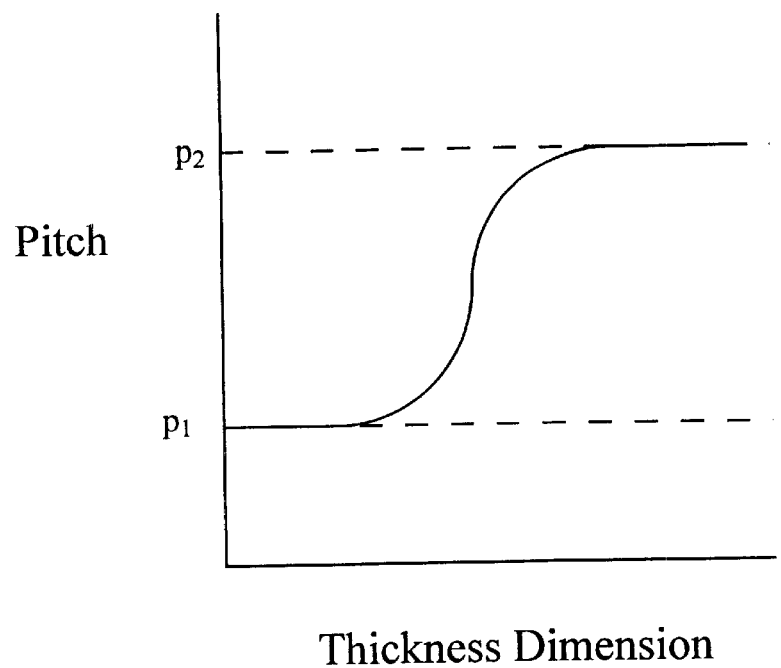
FIG. 11 is a schematic graph of pitch along a thickness dimension of a first embodiment of an optical body with at least one cholesteric liquid crystal layer, according to the invention.

Slide coating can also be used for applying multiple layers. One example of a suitable slide coating device and method is illustrated in FIG. 10. The slide coating device 300 has a coating head 302 that includes a slide surface 302 with openings 304, 306 through which a first coating composition 350 and a second coating composition 352, respectively, are dispensed. The slide surface is typically tilted about 25° to 30° or more, although other angles can be used, as desired. These coating compositions 350, 352 are then coated onto a substrate 354 moving past the slide coating device. Again, a vacuum can be applied through a gap 308 to improve coating quality and uniformity.

Figure 12:
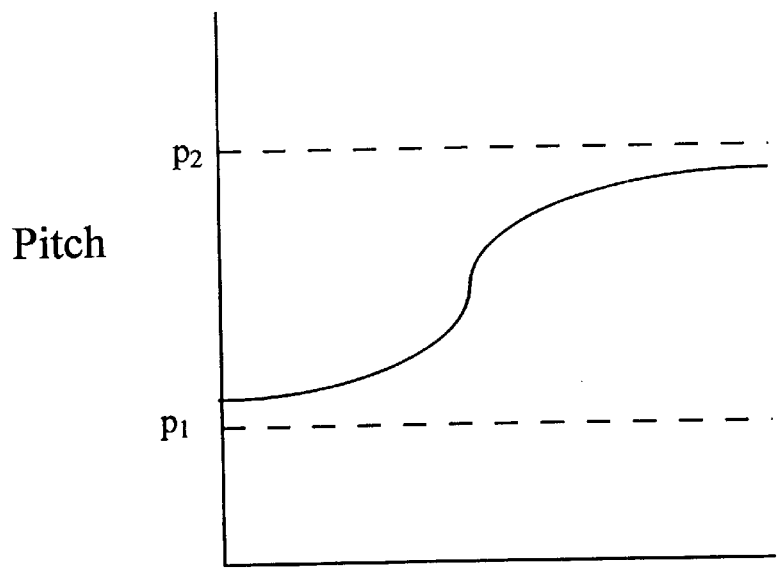
FIG. 12 is a schematic graph of pitch along a thickness dimension of a second embodiment of an optical body with at least one cholesteric liquid crystal layer, according to the invention.

The coating compositions 350 and 352 can include compounds having, for example, UV curable functional groups such as, for example, acrylates or other photocurable functional groups. When such groups are present, interdiffusion between compositions 350 and 352 can be controlled by applying suitable photocuring energy, using radiation sources 356 and 358, for example, ultraviolet lamps. Either one or both radiation sources 356 and 358 are used. A longer time for allowing more interdiffusion could be provided by placing radiation source 358 at position 358'. The degree of interdiffusion could also be controlled by modifying the intensity of radiation sources 356 or 358. The coating compositions 350, 352 can be pulled away from the carrier 354, as illustrated in FIG. 12, and optionally illuminated with light from one or both sides using either or both of light sources 357, 357'.

Figure 18:
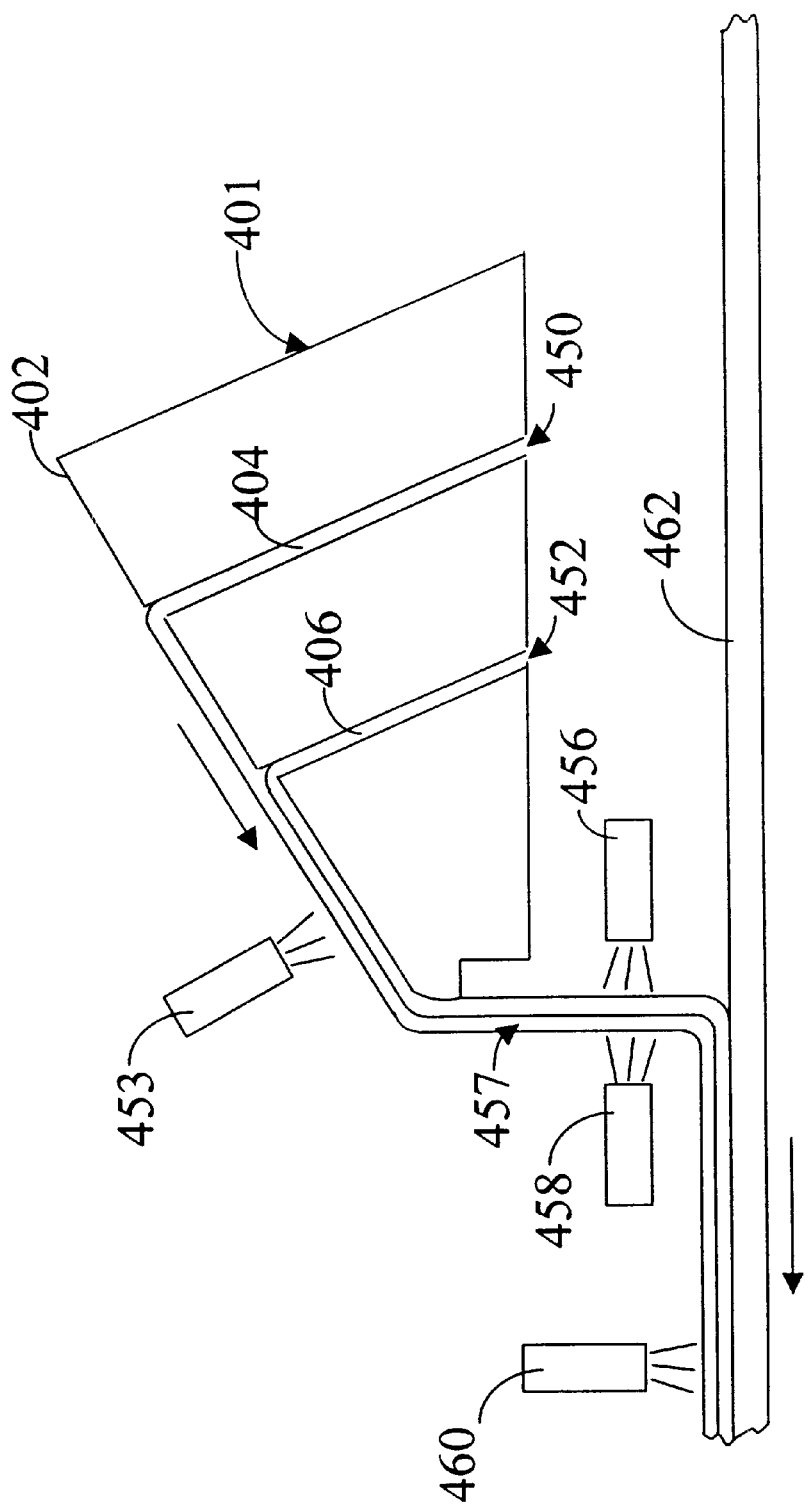
FIG. 18 is a schematic representation of a third embodiment of a method and apparatus for substantially simultaneously coating two cholesteric liquid crystal compositions on a substrate.

Another coating method which can be used for applying multilayer coatings is curtain coating. Referring to FIG. 18, a coating head 401 that includes a surface 402 with openings 404, 406 through which a first coating composition 450 and a second coating composition 452, respectively, are dispensed. The combined coating compositions are then allowed to fall as a curtain 457 onto a moving substrate 462 (e.g., a polymeric film). In an alternative embodiment, the coating head has openings along a substantially vertical surface that allows the coating compositions to begin falling upon leaving the coating head.

The coating compositions 452 and 454 can include compounds having, for example, UV curable functional groups such as, for example, acrylates or other photocurable functional groups. When such compounds are present, interdiffusion between layers 452 and 454 can be controlled by applying suitable photocuring energy, using one or more radiation sources (e.g., one or more of the radiation sources 453, 456, 458, and 460), for example, ultraviolet lamps. A longer time for allowing more interdiffusion could be provided by using only radiation source 460, while a shorter interdiffusion time could be provided by use of radiation source 453. The degree of interdiffusion might also be controlled by controlling the intensity of the radiation sources 453, 456, 458, and 460. It will be appreciated that not all of radiation sources 453, 456, 458, and 480 need be provided, and that additional radiation sources can be provided, as needed. Moreover, the specific number or positions of lamps shown in FIG. 18 is only illustrative. More or fewer lamps in other positions can prove suitable to particular situations.

The devices and methods illustrated in FIGS. 9, 10, and 18 can be modified to simultaneously coat more than two layers onto a substrate. Typically, the coating compositions are selected to have compatible rheologies to permit substantially simultaneous coating. As an alternative coating method, the coating compositions can be deposited individually or in two or more groups.

Typically, before, during, or after coating of the substrate with the two coating compositions, at least a portion of the first coating composition interdiffuses with at least a portion of the second coating composition. This interdiffusion generally occurs along and spreads from the interface between the two coating compositions.

The rate of interdiffusion depends upon a variety of factors including, for example, the specific materials used in each composition, the molecular weight of the materials, the temperature of the compositions, the viscosity of the compositions, the degree of polymerization of each composition, and the solvent/solute interaction parameters within each coating composition and between compositions. A desired diffusion rate can be obtained by controlling one or more of these variables, for example, by choice of materials, temperature, viscosity, polymer and solvent molecular weight, or a combination of these variables.

The rate of interdiffusion can also be influenced by the degree of crosslinking or other curing that takes place during or after coating. While providing polymerizable or crosslinkable reactive groups in the coating dispersions can be used to control interdiffusion, such reactions can also have effects on coating properties or adhesion. In order to utilize polymerization or crosslinking to control interdiffusion, while avoiding some of the effects of rapid or early reactions, an interdiffusion control layer could be added between the coating compositions. This interdiffusion control layer contains a higher level of reactive groups (e.g., polymerizable or crosslinkable) than either of the coating compositions. The interdiffusion control layer forms, upon irradiation with, for example, UV light, a barrier to limit the level of diffusion between the coating compositions, without producing an undesirable level of polymerization or crosslinking in the coating compositions.

In some embodiments in which the coating compositions include monomers that are polymerized to form the cholesteric liquid crystal layer, the monomers can be partially polymerized before, during, or after coating, but before completing the diffusion between the two coating compositions. For example, one or more curing light or radiation sources can be positioned at one or more points along the processing path to partially cure (e.g., polymerize or crosslink) the monomers at particular rates. This can be done to alter the diffusion rate to control the pitch profile in the final cholesteric liquid crystal layer(s).

After the desired amount of interdiffusion, the first and second coating compositions are then converted into one or more liquid crystal layers. The coating compositions can be converted by a variety of techniques, the choice of which typically depends, at least in part, on the materials used in the coating compositions. Conversion techniques include, for example, the elimination of substantially all of the solvents from the coating compositions (by, for example, drying or polymerizing or crosslinking the solvent) and the polymerization or crosslinking of the materials in the coating compositions. The liquid crystal layers are then converted to the cholesteric liquid crystal phase as described above. In some embodiments, drying and curing (polymerization or crosslinking) are both used. Drying can occur before, after, or simultaneously with full or partial curing.

A variety of different pitch profiles can be formed. FIGS. 11 to 15 illustrate examples of possible profiles, however, a wide variety of other profiles can be generated. The profile in FIG. 11 can be achieved by, for example, allowing interdiffusion between two liquid cholesteric liquid crystal compositions having pitches $p_1$ and $p_2$, respectively. The interdiffusion is controlled so that at least a portion of the each coating composition remains relatively free from incorporation of the other coating composition. This results in a structure where the pitch of the cholesteric liquid crystal layer varies from $p_1$ to $p_2$.

FIG. 12 illustrates a pitch profile that can be achieved by, for example, allowing interdiffusion between two cholesteric liquid crystal compositions having pitches $p_1$ and $p_2$, respectively, so that there is substantially no unmixed material remaining. In this structure, the pitch ranges between two values that are between $p_1$ and $p_2$. It will be understood, that in an alternative embodiment the thickness of the two compositions or the interdiffusion rate of the compositions can also be selected so that a portion of only one of the cholesteric liquid crystal compositions remains unmixed.

Figure 13:
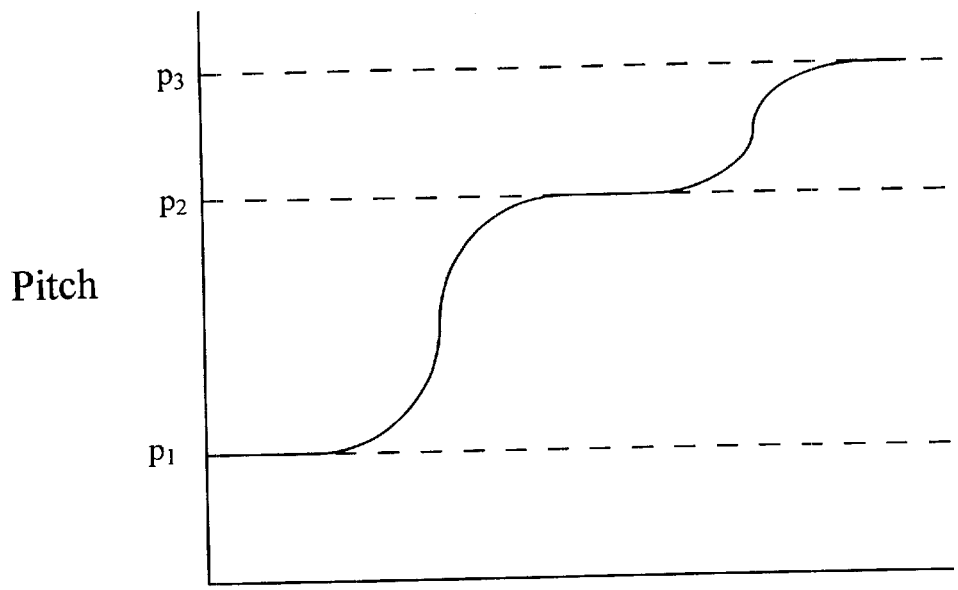
FIG. 13 is a schematic graph of pitch along a thickness dimension of a third embodiment of an optical body with at least one cholesteric liquid crystal layer, according to the invention.

FIG. 13 illustrates a pitch profile that can be achieved by, for example, allowing interdiffusion between three cholesteric liquid crystal compositions having pitches $p_1$, $p_2$, and $p_3$, respectively. This can be accomplished by simultaneous interdiffusion between the three compositions or by allowing interdiffusion between the first and second compositions and then coating the third composition and allowing interdiffusion between the second and third compositions.

Figure 14:
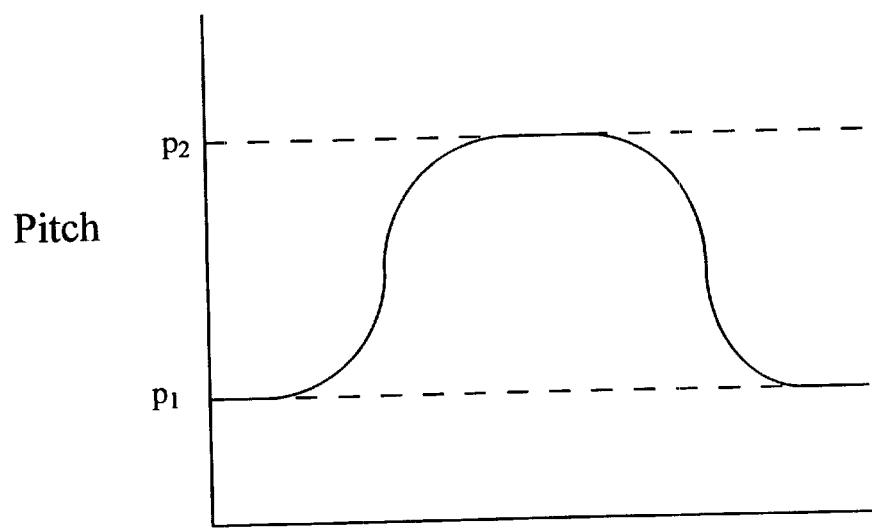
FIG. 14 is a schematic graph of pitch along a thickness dimension of a fourth embodiment of an optical body with at least one cholesteric liquid crystal layer, according to the invention.

FIG. 14 illustrates a pitch profile that can be achieved by, for example, coating a second cholesteric liquid crystal composition between two layers of a first liquid crystal composition and permitting interdiffusion between the layers. In an alternative embodiment, the first and third layers are different with the pitch of the third layer being lower than the pitch of the second layer and higher or lower than the pitch of the first layer. In this embodiment, the pitch does not monotonically increase or decrease. In other words, the pitch increases and then decreases. The non-monotonic change in pitch can be useful as an apodizing technique to reduce the size of side peaks outside the primary reflective bandwidth. Such side peaks are illustrated in FIG. 8 around 730 and 780 nm.

Figure 15:
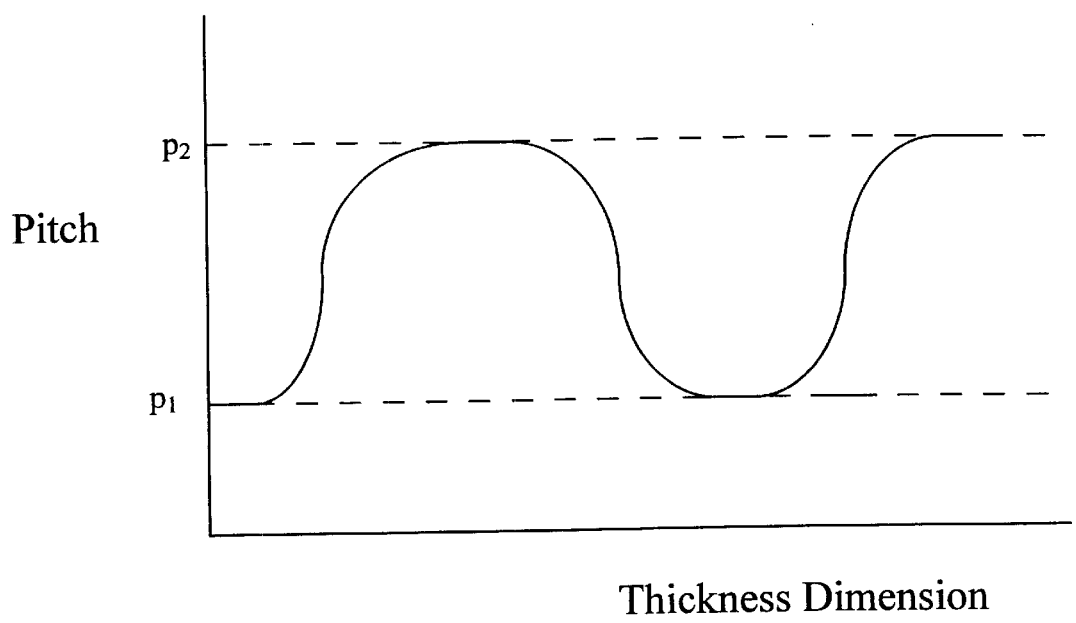
FIG. 15 is a schematic graph of pitch along a thickness dimension of a fifth embodiment of an optical body with at least one cholesteric liquid crystal layer, according to the invention.

FIG. 15 illustrates a pitch profile for a four layer structure where the first and third layers are formed using the same first cholesteric liquid crystal composition and the second and fourth layers using the same second cholesteric liquid crystal composition. In this embodiment, the pitch profile increases over two ranges and decreases over two ranges. It will be understood, however, that different cholesteric liquid crystal compositions can be used for each of the four layers and that the pitch profile need not alternate between increasing and decreasing. It will also be understood that other pitch profiles can be generated using five or more layers.

The width and shape of the pitch profile, particularly that portion where pitch changes with thickness, can be modified or controlled. Factors that can be used to determine or control the pitch profile include, for example, the interdiffusion rate, the time allowed for interdiffusion, the materials of the liquid crystal coating composition, modification of the composition (e.g., polymerization or crosslinking) during or before interdiffusion, the temperature, and the solvent/solute interaction parameters within each coating composition and between compositions.

The cholesteric liquid crystal layer(s) formed in this manner can be used in a variety of optical bodies, including, for example, reflective polarizers and polarizing beamsplitters. These optical bodies can include other components including, for example, a quarter wave plate to convert the circularly polarized light to linear polarized light. The particular materials and layers for polarizers can be selected to achieve a desired reflective bandwidth. The optical bodies can be used in applications such as transmissive, reflective, or transflective liquid crystal displays and as contrast enhancement films.

As an example, a broadband reflective polarizer can be formed according to the methods and configurations described herein. This broadband reflective polarizer can substantially uniformly (e.g., with no more than about 10% or 5% variation) reflect light of one polarization over a wavelength range of 100 nm, 200 nm, or 300 nm or more. In particular, a broadband reflective polarizer can be formed that substantially uniformly reflects light of one polarization over the visible wavelength range (e.g., from about 400 to 750 nm).

Display Examples

Figure 16:
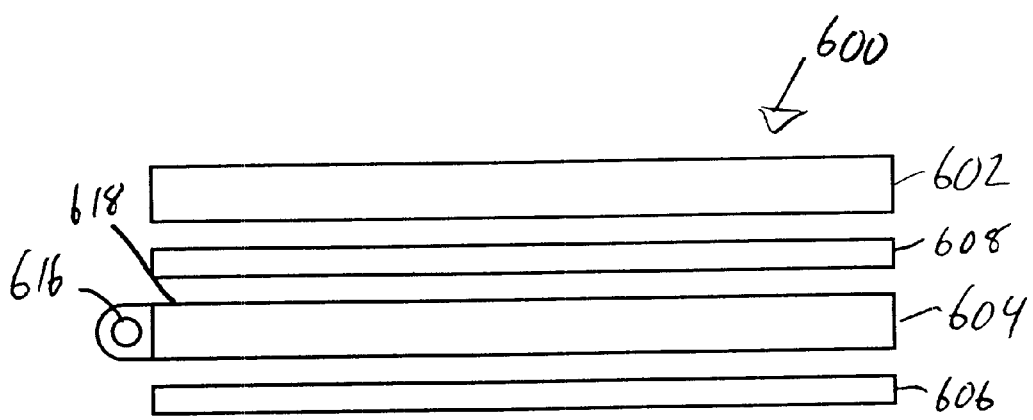
FIG. 16 is a schematic illustration of one embodiment of a liquid crystal display, according to the invention.

The cholesteric liquid crystal optical bodies can be used in a variety of optical displays and other applications, including transmissive (e.g., backlit), reflective, and transflective displays. For example, FIG. 16 illustrates a schematic cross-sectional view of one illustrative backlit display system 600 including a display medium 602, a backlight 604, a cholesteric liquid crystal reflective polarizer 608, as described above, and an optional reflector 606. The display system optionally includes a quarter wave plate as part of the cholesteric liquid crystal reflective polarizer or as a separate component to convert the circularly polarized light from the liquid crystal reflective polarizer to linearly polarized light. A viewer is located on the side of the display device 602 that is opposite from the backlight 604.

The display medium 602 displays information or images to the viewer by transmitting light that is emitted from the backlight 604. One example of a display medium 602 is a liquid crystal display (LCD) that transmits only light of one polarization state.

The backlight 604 that supplies the light used to view the display system 600 includes, for example, a light source 616 and a light guide 618, although other backlighting systems can be used. Although the light guide 618 depicted in FIG. 16 has a generally rectangular cross-section, backlights can use light guides with any suitable shape. For example, the light guide 618 can be wedge-shaped, channeled, a pseudo-wedge guide, etc. The primary consideration is that the light guide 618 be capable of receiving light from the light source 616 and emitting that light. As a result, the light 618 can include back reflectors (e.g., optional reflector 606), extraction mechanisms and other components to achieve the desired functions.

The reflective polarizer 608 is an optical film that includes at least one cholesteric liquid crystal optical body, as described above. The reflective polarizer 608 is provided to substantially transmit light of one polarization state exiting the light guide 618 and substantially reflect light of a different polarization state exiting the light guide 618.

Figure 17:
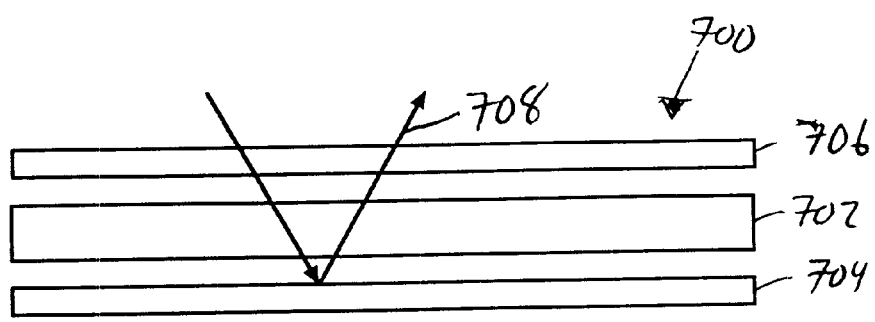
FIG. 17 is a schematic illustration of another embodiment of a liquid crystal display, according to the invention.

FIG. 17 is a schematic illustration of one type of reflective liquid crystal display 700. This reflective liquid crystal display 700 includes a display medium 702, a mirror 704, and a reflective polarizer 706. The display system optionally includes a quarter wave plate as part of the cholesteric liquid crystal reflective polarizer or as a separate component to convert the circularly polarized light from the liquid crystal reflective polarizer to linearly polarized light. Light 708 is polarized by the reflective polarizer, travels through the display medium, bounces off the mirror, and goes back through the display medium and reflective polarizer. The reflective polarizer of this reflective liquid crystal display 700 includes one cholesteric liquid crystal optical body, as described above. The specific choice of cholesteric liquid crystal optical body can depend on factors such as, for example, cost, size, thickness, materials, and wavelength range of interest.

The cholesteric liquid crystal optical body can be used with a variety of other components and films that enhance or provide other properties to a liquid crystal display. Such components and films include, for example, brightness enhancement films, retardation plates including quarter-wave plates and films, multilayer or continuous/disperse phase reflective polarizers, metallized back reflectors, prismatic back reflectors, diffusely reflecting back reflectors, and multilayer dielectric back reflectors.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A method of making an optical body, the method comprising steps of:
    coating a first coating composition and a second coating composition onto a substrate, the first coating composition being disposed between the substrate and the second coating composition, the first and second coating compositions being different and each comprising at least one cholesteric liquid crystal material selected from cholesteric liquid crystal compounds and cholesteric liquid crystal monomers;
    interdiffusing at least a portion of the second coating composition with the first coating composition; and
    forming at least one cholesteric liquid crystal layer from the first and second coating compositions after interdiffusing at least a portion of the second liquid crystal composition on the substrate with the first liquid crystal composition on the substrate.

2. The method of claim 1, wherein the step of coating the first and second coating compositions comprises simultaneously coating the first and second coating compositions on the substrate.

3. The method of claim 2, wherein the step of simultaneously coating the first and second coating compositions comprises simultaneously coating the first and second coating compositions on the substrate using a technique selected from slide coating, curtain coating, extrusion bar coating, and combinations thereof.

4. The method of claim 1, wherein the step of forming at least one cholesteric liquid crystal layer comprises forming at least one cholesteric liquid crystal layer wherein a pitch of the cholesteric liquid crystal layer substantially continuously changes along at least a portion of a thickness dimension of the at least one cholesteric liquid crystal layer.

5. The method of claim 4, wherein the step of forming at least one cholesteric liquid crystal layer comprises forming at least one cholesteric liquid crystal layer wherein a pitch of the cholesteric liquid crystal layer monotonically changes along at least a portion of a thickness dimension of the at least one cholesteric liquid crystal layer.

6. The method of claim 4, wherein the step of forming at least one cholesteric liquid crystal layer comprises forming at least one cholesteric liquid crystal layer wherein a pitch of the cholesteric liquid crystal layer increases to a first pitch value and then decreases to a second pitch value along at least a portion of a thickness dimension of the at least one cholesteric liquid crystal layer.

7. The method of claim 4, wherein the step of forming at least one cholesteric liquid crystal layer comprises forming at least one cholesteric liquid crystal layer wherein a pitch of the cholesteric liquid crystal layer increases to a first pitch value, decreases to a second pitch value, and then increases to a third pitch value along at least a portion of a thickness dimension of the at least one cholesteric liquid crystal layer.

8. The method of claim 1, wherein the first coating composition further comprises a first solvent and the second coating composition further comprises a second solvent and wherein the step of forming at least one cholesteric liquid crystal layer comprises eliminating substantially all of the first and second solvents.

9. The method of claim 1, wherein the at least one cholesteric liquid crystal material of the first coating composition comprises first liquid crystal monomers and the at least one cholesteric liquid crystal material of the second coating composition comprises second liquid crystal monomers and wherein the step of forming at least one cholesteric liquid crystal layer comprises polymerizing the first liquid crystal monomers and the second liquid crystal monomers to form first liquid crystal compounds and second liquid crystal compounds.

10. The method of claim 9, further comprising polymerizing at least a portion of at least one of the first and second liquid crystal monomers prior to completing the step of interdiffusing at least a portion of the first coating composition with the second coating composition.

11. The method of claim 9, wherein the step of interdiffusing at least a portion of the second coating composition into the first coating composition occurs prior to polymerizing any portion of the first and second liquid crystal monomers.

12. The method of claim 9, wherein the step of polymerizing the first liquid crystal monomers and the second liquid crystal monomers comprises copolymerizing at least a portion of the second liquid crystal monomers with at least a portion of the first liquid crystal monomers.

13. The method of claim 1, wherein the first coating composition further comprises a first nematic liquid crystal material and the second coating composition further comprises a second nematic liquid crystal material.

14. The method of claim 13, wherein the first and second cholesteric liquid crystal materials are the same.

15. The method of claim 14, wherein the first and second nematic liquid crystal materials are the same and a ratio by weight of first cholesteric liquid crystal material to first nematic liquid crystal material in the first coating composition is different than a ratio by weight of second cholesteric liquid crystal material to second nematic liquid crystal material in the second coating composition.

16. The method of claim 1, further comprising coating a third coating composition onto the second coating composition, the second and third coating compositions being different, the third coating composition comprising at least one cholesteric liquid crystal material selected from cholesteric liquid crystals and cholesteric liquid crystal monomers; and interdiffusing at least a portion of the third coating composition with the second coating composition.

17. A method of making an optical body, the method comprising:

disposing a first coating composition on a substrate, the first coating composition comprising a first solvent and a first cholesteric liquid crystal material selected from cholesteric liquid crystals and cholesteric liquid crystal monomers;

disposing a second coating composition on the first coating composition, the second coating composition comprising a second solvent and a second cholesteric liquid crystal material selected from the group consisting of cholesteric liquid crystals and cholesteric liquid crystal monomers, wherein the first and second coating compositions are different;

interdiffusing at least a portion of the second coating composition with at least a portion of the first coating composition before eliminating substantially all of the first solvent and before eliminating substantially all of the second solvent;

eliminating substantially all of the first and second solvents; and forming at least one cholesteric liquid crystal layer from the first and second coating compositions, the cholesteric liquid crystal layer having a pitch that substantially continuously changes over a range of values along at least a portion of a thickness dimension of the layer.

18. The method of claim 17, wherein disposing a first coating composition comprises disposing the first coating composition on the substrate, the first coating composition comprising cholesteric liquid crystal monomers and nematic liquid crystal monomers.

19. The method of claim 18, wherein disposing a second coating composition comprises disposing the second coating composition on the substrate, the second coating composition comprising the cholesteric liquid crystal monomers and the nematic liquid crystal monomers in a different ratio by weight than the first coating composition.

20. The method of claim 18, wherein forming an optical body comprises polymerizing the cholesteric liquid crystal monomers and the nematic liquid crystal monomers.

21. The method of claim 17, wherein disposing a first coating composition and disposing a second coating composition comprises substantially simultaneously disposing the first and second coating compositions on the substrate.

22. The method of claim 21, wherein the step of simultaneously disposing the first and second coating compositions comprises substantially simultaneously disposing the first and second coating compositions on the substrate using a technique selected from the group consisting of slide coating, coating, curtain coating, extrusion bar coating, and combinations thereof.

23. The method of claim 17, further comprising disposing, over the second coating composition, a third coating composition comprising a third solvent and a third cholesteric liquid crystal material selected from the group consisting of cholesteric liquid crystals and cholesteric liquid crystal monomers; and interdiffusing at least a portion of the third coating composition with at least a portion of the second coating composition before eliminating substantially all of the second solvent and before eliminating substantially all of the third solvent.

24. The method of claim 23, wherein eliminating substantially all of the first and second solvents comprises eliminating substantially all of the first, second, and third solvents to form an optical body comprising at least one cholesteric liquid crystal layer, including the first, second, and third coating compositions, with a pitch that substantially continuously changes along at least a portion of the thickness dimension of the layer.

25. An optical body, comprising:

a cholesteric liquid crystal layer wherein, along a thickness dimension of the layer, a pitch of the cholesteric liquid crystal layer begins at a first pitch, increases to a second pitch, decreases to a third pitch, and increases to a fourth pitch.

26. The optical body of claim 25, wherein, along a thickness dimension of the layer, a pitch of the cholesteric liquid crystal layer begins at a first pitch at a first major surface of the cholesteric liquid crystal layer, increases to a second pitch, decreases to a third pitch, and increases to a fourth pitch.

27. The optical body of claim 25, wherein, along a thickness dimension of the layer, a pitch of the cholesteric liquid crystal layer begins at a first pitch at a first major surface of the cholesteric liquid crystal layer, increases to a second pitch, decreases to a third pitch, and increases to a fourth pitch at a second major surface of the cholesteric liquid crystal layer.

28. An optical display, comprising:

a display medium; and a reflective polarizer comprising a cholesteric liquid crystal layer wherein, along a thickness dimension of the layer, a pitch of the cholesteric liquid crystal layer begins at a first pitch, increases to a second pitch, decreases to a third pitch, and increases to a fourth pitch.

29. A method of making an optical display, comprising:

coating a first coating composition and a second coating composition onto a substrate, the first coating composition being disposed between the substrate and the second coating composition, the first and second coating compositions being different and each comprising at least one cholesteric liquid crystal material selected from cholesteric liquid crystal compounds and cholesteric liquid crystal monomers;

interdiffusing at least a portion of the second coating composition with the first coating composition;

forming at least one cholesteric liquid crystal layer from the first and second coating compositions only after interdiffusing at least a portion of the second liquid crystal composition on the substrate with the first liquid crystal composition on the substrate;

forming a reflective polarizer comprising the at least one cholesteric liquid crystal layer and the substrate; and forming a liquid crystal display using the reflective polarizer and a display medium.

* * * * *